United States Patent
Lambert

(10) Patent No.: US 7,590,863 B2
(45) Date of Patent: Sep. 15, 2009

(54) METHODS OF PROVIDING JAVA TAMPERPROOFING

(75) Inventor: Martin R. Lambert, Twyford (GB)

(73) Assignee: SealedMedia Limited, Buckinghamshire (GB)

( * ) Notice: Subject to any disclaimer, the term of this patent is extended or adjusted under 35 U.S.C. 154(b) by 729 days.

(21) Appl. No.: 10/398,567

(22) PCT Filed: Oct. 11, 2001

(86) PCT No.: PCT/GB01/04533

§ 371 (c)(1),
(2), (4) Date: Apr. 8, 2003

(87) PCT Pub. No.: WO02/31648

PCT Pub. Date: Apr. 18, 2002

(65) Prior Publication Data

US 2004/0039926 A1  Feb. 26, 2004

(30) Foreign Application Priority Data

Oct. 11, 2000  (GB)  .................................. 0024918.5

(51) Int. Cl.
  *G06F 11/30* (2006.01)
(52) U.S. Cl. ..................... 713/189; 713/193; 713/194
(58) Field of Classification Search ......... 713/189–193, 713/194; 726/4; 705/52, 64; 717/127, 168
See application file for complete search history.

(56) References Cited

U.S. PATENT DOCUMENTS

| | | | | |
|---|---|---|---|---|
| 5,805,829 A | * | 9/1998 | Cohen et al. | ................. 709/202 |
| 5,937,411 A | * | 8/1999 | Becker | .................... 707/103 R |
| 6,044,467 A | | 3/2000 | Gong | |
| 6,202,208 B1 | * | 3/2001 | Holiday, Jr. | .................. 717/166 |
| 6,629,128 B1 | * | 9/2003 | Glass | ......................... 709/203 |
| 6,823,460 B1 | * | 11/2004 | Hollander et al. | .............. 726/3 |
| 6,938,263 B2 | * | 8/2005 | Wollrath et al. | ............. 719/330 |
| 2002/0055910 A1 | * | 5/2002 | Durbin | ........................ 705/64 |

OTHER PUBLICATIONS

Eckel "Thinking in Java" 2nd Edition, Revision 11, Published in Apr. 24, 2000, pp. 1-9.*
Gong, "Secure Java Class Loading," *IEEE Internet Computing*, pp. 56-61, Nov. 1998, (XP-002177474).

(Continued)

*Primary Examiner*—Kimyen Vu
*Assistant Examiner*—Baotran N To
(74) *Attorney, Agent, or Firm*—Townsend and Townsend and Crew LLP

(57) ABSTRACT

A method of protecting Java bytecode is provided that includes the steps of encrypting at least one Java class file to produce at least one encrypted Java class file (414a) which is archived in an archive (414). A Java application that depends on the encrypted Java archive (414) is configured to run by first loading an application stub class (414b) and calling an entry point within the application stub class (414b). A method is provided of running a Java application that uses such a previously encrypted Java archive (414). The method includes the steps of loading an application stub class (414b). An entry point within the application stub class (414b) is called thereby to call a secure class loader to enable the at least one encrypted Java class file (414a) to be loaded from the archive (414) and decrypted.

20 Claims, 9 Drawing Sheets

OTHER PUBLICATIONS

Delaigle et al., "Digital Images Protection Techniques in a Broadcast Framework: An Overview," *Proceedings of the European Conference on Multimedia Applications, Services and Techniques*, vol. 2:711-727 (May 1996) (XP000199920).

Islam et al., "A Flexible Security Model for Using Internet Content," *Proceedings of SRDS '97: $16_{th}$ IEEE Symposium on Reliable Distributed Systems*, pp. 1-11 (Oct. 1997) (XP002138803).

* cited by examiner

METHODS OF PROVIDING JAVA TAMPERPROOFING

This application is the National Phase of International Application PCT/GB01/04533 filed Oct. 11, 2001 which designated the U.S. and that International Application was published in English under PCT Article 21 (2) on Apr. 18, 2002 as International Publication Number WO 02/31648 A2. PCT/GE01/04533 claims priority to British Application No. 0024918.5, filed Oct. 11, 2000. The entire contents of these applications are incorporated herein by reference.

The present invention relates to a method of protecting Java bytecode and to a method of running a Java application that uses a previously encrypted Java archive.

The present invention is generally in the field of digital rights management (DRM) and limits the potential for decompiling or reverse engineering from bytecode to the original Java source code.

If there is to be a viable commerce based upon the electronic distribution of valuable multimedia content (such as for example reports, images, music tracks, videos, etc.), then there must be some means of enforcing and retaining copyright control over the electronic content. There is now emerging a set of hardware and software solutions, generically known as digital rights management (DRM) solutions, that aim to provide this copyright control while, to a varying degree, also enabling new commercial methods suited to the Internet and electronic delivery. Common to virtually all these solutions is the requirement that the multimedia content be distributed within a persistent tamperproof encryption wrapper (the idea being that a million copies of encrypted content is no more valuable than one). Very simply, DRM works by carefully providing the consumers of this encrypted content with secret decryption keys that provide temporary access to the content for some controlled purpose, e.g. viewing, printing, playing, etc. without ever providing access to the raw decrypted content that could be used for unauthorised reuse or redistribution.

FIG. 1 illustrates schematically an overview of how typical DRM systems work. Referring to FIG. 1, a "publisher" of digital content seals their digital content, buffers or streams within a layer of encryption and digital signatures into a DRM-encrypted content format 102. The encryption makes it difficult for malicious consumers to obtain access to the raw decrypted content (and make unauthorised copies for redistribution). The digital signatures prevent malicious consumers or hackers from tampering with the encrypted content (perhaps to pass off the content as their own or redistribute for free content that normally has to be paid for) by enabling the DRM system to detect the smallest change to the encrypted content. The DRM-encrypted content 102 can then be delivered to consumers via any electronic distribution medium 104, e.g. web, ftp, email, CD-ROM, etc. The publisher need not worry about protecting the DRM-encrypted content 102 in transit to the consumer since it is inherently protected by its encryption layer and digital signatures.

Less sophisticated DRM systems sometimes bundle individual consumer access rights with the content, either within the encryption layer or at least protected by the digital signatures. The advantage of bundling rights with the content is that the consumer can obtain both the content and the rights at the same time. Disadvantages include extreme inflexibility in the rights management policies that can be implemented and an enormous versioning problem (since there needs to be a separate version of the encrypted content 102 for each consumer and a new version of the encrypted content whenever the rights change).

More sophisticated DRM systems deliver the rights separately from the content (from a DRM server 108). The rights are encoded in some electronic format 110 (i.e. electronic "rights") and specify the permitted relationship between consumers and DRM-encrypted content sets (and subsets), e.g. which content the consumer can access, what they are permitted to do with it (e.g. printing), and for how long.

A specialised viewer (the DRM client 106) resident on the consumer device is required to obtain, manage and interpret the rights, temporarily decrypt the encrypted content and view/play it within a secure environment (so that the consumer cannot obtain access to the raw decrypted content or the decryption keys) subject to the restrictions implied by the consumer's rights (e.g. view but do not print a document). The DRM server 108 is responsible for issuing rights to requesting DRM clients 106. Current DRM systems typically issue rights to authenticated consumers at the time of purchase (or grant) and the rights are transferred to permanent storage on the consumer device 106. The DRM server 108 plays no further role in the ongoing use of those rights.

A non-limiting description of several terms used herein will now be given to aid the understanding of the present invention.

In general, "rights" can be thought of as an electronic description (explicit or by implication) of the association between consumers (or consumer devices) and DRM-protected content sets. Rights can optionally specify means of identifying the consumer (or consumer device) to which the rights "belong"; means of identifying the content sets and subsets to which the rights apply; encryption keys and checksums (cryptographic or otherwise); and the specific access rights granted to the consumers (and/or their consumer devices) over those content sets (e.g. whether or not the consumer can print a document, the duration of access, etc.). Rights can be encoded in any machine-readable form (e.g. parsable languages, specialised data structures, etc.) and are used internally by the DRM system to grant, deny or meter consumer access to encrypted content.

"Bytecode" refers to machine-independent code generated by a Java compiler and executed by a Java interpreter.

"Class" refers to the basic data structure in the Java programming language. Classes have member data and member functions and are instantiated to objects.

"Class file" refers to a file containing the bytecode required to implement a given Java class. The Java compiler generates a separate class file for each class, even if they are defined in the same Java source file.

"Class loader" refers to a special class used to load other classes from arbitrary data sources, e.g. the local file system, networks, archives, etc. The Java programming language allows the development of new class loaders to support the loading of classes from new data sources, e.g. loading classes from encrypted archives.

"Native method" refers to a method defined within a Java class whose implementation is not in Java within the same source file but in a separate loadable module compiled from a different programming language.

"Native method API (application programming interface)" refers to the programming API available to developers of native methods. This includes methods of "up-calling" back into Java (from whence the native method was originally invoked).

"Operating system" (OS) refers to the (usually pre-installed) low-level software which handles the interface to peripheral hardware, schedules tasks, allocates storage, and presents a default interface to the user when no application program is running.

"Device driver" refers to a special software program which is capable of operating within the lowest levels of the operating system and capable of directly manipulating the low-level hardware components that make up the computing device (e.g. memory, video memory, disk drives, etc.).

"Java virtual machine (JVM)" refers to a software "execution engine" that safely and compatibly executes the bytecodes in Java class files on a microprocessor (whether in a computer or in another electronic device). The JVM comprises a bytecode interpreter, considerable compiled Java class libraries, and native methods providing OS-dependent functionality.

"Java application" refers to one of two categories of Java executable components: applications or applets. Applets are typically taken to mean specialised Java applications that support a defined interface that suits them to running in the context of a web browser. For the purposes of this specification, this distinction is irrelevant and, unless explicitly stated, the term Java application is to be taken to refer to any executable Java component (e.g. Java applications, applets, servlets, beans, etc.).

"Java archive" refers to a grouping of class files. Java archives are made to optimise the downloading of Java applications over networks and to group Java classes together into related modules. It is very common for JVMs to be capable of loading class files from within common archive formats, such as ZIP files, JAR files, CAB files, etc. These archive formats typically support compression, digital signing to verify authenticity, etc.

Software is one form of digital content and is itself vulnerable to unauthorised access, tampering and/or redistribution, especially as it is now routinely downloaded over the Internet. The Java programming language from SUN Microsystems provides some unique features that make it an ideal software development platform for the next generation of net-enabled, download-on-demand software applications. These features include (i) bytecode runtime images capable of execution within standardised JVM interpreters running on any operating system (OS): "Write once, Run anywhere" in the parlance of the Java authors; (ii) late binding language implementation: application components (classes) can be downloaded incrementally and on demand; and (iii) simple stack-based JVMs which are highly portable to next-generation mobile devices.

Unfortunately, these very features that make Java so suitable for net-enabled applications also expose a particular vulnerability: Java applications can trivially be decompiled or reverse engineered from bytecode to the original source code and trivially patched with malicious code fragments. The late binding nature of the language means that much of the symbolic information in the source code (e.g. the names of class member functions and class member data) is passed through to the bytecode. The simple syntax of the language combined with the simple stack-based nature of the JVM means that the operational bytecode is very simple, relatively non-optimised and closely related to the original Java source code from which it was compiled. In short, Java applications are particularly vulnerable to tampering or hacking.

The Java compilation process and the ease with which it can be reverse engineered (decompiled) and tampering process are illustrated schematically in FIG. 2. As illustrated, Java source code 202 is compiled in a Java compilation step 204 to obtain low level bytecode 206. End-users can then download the bytecode 206 as shown in step 208, via the internet or some other transmission medium, which bytecode 206 can then be executed by JVMs 210. Once downloaded, the user can, as illustrated in step 212, maliciously decompile it to look like the original Java source code 202', modify it to obtain modified Java source code 202", and then in step 214 recompile it to obtain a tampered version of the Java application 200.

There are presently two main approaches to protecting Java from tampering: bytecode obfuscation and bytecode encryption/scrambling.

FIG. 3 illustrates schematically the process of bytecode obfuscation. Java source code 302 is compiled in step 304 to obtain bytecode 306 in the manner previously described. Thereafter, as shown by step 308, bytecode obfuscation is performed to make the bytecode more difficult to understand by removing as much helpful information as possible from the bytecode (e.g. renaming variables to cryptic strings) and making changes to the operational bytecode to make it harder to read without changing the actual operations (e.g. unrolling loops, optimising away variables, etc.). This results in an obfuscated Java bytecode 310. When maliciously decompiled, as shown by step 312, the decompiled source code 302' is thus difficult to read, i.e. obfuscated.

In practice, obfuscation is only marginally useful in protecting a Java application from complete reverse engineering into Java source code even though the resultant Java source code (recovered from obfuscated bytecode) is quite different from how it would appear if written by a human engineer. Unfortunately, a practical significant threat to Java applications generally involves relatively small amounts of reverse engineering in key code sections (e.g. where a Java application processes a credit card request) in order to make relatively small "patches" (e.g. writing the credit card information out to disk). Obfuscation cannot change the areas in the bytecode that interface to the built-in Java class libraries or third party Java code and therefore obfuscation is not particularly effective.

A more proactive means of protecting Java from tampering is to encrypt or scramble the bytecode so that it cannot be reverse engineered at all. However, this approach requires a method by which the encrypted bytecode can be loaded into standard off-the-shelf JVMS. Java does provide a mechanism for extending JVMs to load bytecode from new sources via the class loader mechanism. Developers can define a class (called a class loader) which can read the raw bytecode of a class from, for example, within an encrypted file and load the class into the JVM's internal memory structures (from which it is far more difficult to reverse engineer). These class loaders are actually used by base Java implementations to read classes from the local file system (for example, the class loader that loads classes from the local file system, as defined by the CLASSPATH environment variable, is known as the system class loader), archives and the network. Unfortunately, these class loaders are themselves implemented in Java (although like many system classes they use native methods) and are therefore themselves vulnerable to tampering. Although some attempts at protecting Java from tampering have been based upon creating new class loaders, they are relatively ineffective since the hacker can simply reverse engineer the class loader to obtain access to the decrypted class bytecode.

In the context of digital rights management (DRM), Java applications are just another form of digital content, easily distributable by digital means (e.g. the Internet) but vulnerable to reverse engineering, tampering and unauthorised redistribution.

According to a first aspect of the present invention, there is provided a method of running a Java application that uses a previously encrypted Java archive, the encrypted Java archive comprising at least one encrypted Java class file, the method comprising the steps of: using a secure Class loader to load the at least one encrypted Java cla file from the archive into a Java virtual machine.

In one preferred embodiment, the secure class loader is implemented by a native method cooperating with a file hook which intercepts and modifies file input/output requests. A device driver may be loaded to install the file hook.

In another preferred embodiment, the secure class loader is implemented by a native method cooperating with a patch which intercepts and modifies file input/output requests.

In another preferred embodiment, the secure class loader is implemented by a native method cooperating with a trap patch which intercepts and modifies file input/output requests. In some operating systems, such as MacOS, applications access OS kernel service entry points by looking up an offset that identifies the particular entry point, loading this offset into a pre-defined location, and firing a software interrupt (known as a "trap"). A separate trap dispatcher handles the interrupt and looks up the offset set by the calling process. This offset is used to look up the address of the desired kernel service from a table mapping offsets to service entry point addresses. The trap handler then transfers CPU execution to this address. Standard MacOS services enable "trap patching" whereby application processes (or special processes executed at OS start-up) can load a code fragment (the patch) into global memory and substitute the address of this patch in place of the actual kernel service entry point address in the trap dispatcher's table. Thus, when the actual kernel service is loaded, and a software interrupt is fired, the trap handler transfers execution, to the patch code. The patch code is then executed in place of the kernel service (although it can itself call the kernel service).

Implementing the secure class loader from within a native method means that it can be called in a single, opaque operation (unlike a vulnerable Java class loader for example). The (installable) file hook, patch, trap patch or other similar modification enables file input/output to/from the encrypted archive to be intercepted so that the encrypted Java archive can be decrypted to its pre-encrypted form to an internal memory buffer, from where subsequent class loading can proceed.

The method may comprise the steps of: loading an application stub class; and, calling an entry point within the application stub class thereby to call the secure class loader. The application stub can be used to execute DRM native methods and decrypt and load the protected classes without requiring any modifications to the protected Java classes and particularly without requiring any modifications to the source code of the Java application.

In one embodiment, the application stub class is not contained in the archive so that it can invoke the secure class loader to pre-emptively decrypt the archive before the Java virtual machine has opened the archive.

The application stub class may be saved locally at a client device where the Java application is run.

In another embodiment, the application stub class is located within the archive.

The method preferably comprises the step of stimulating file input/output requests to the archive by the step of the secure class loader attempting to load a proxy class from the archive. The proxy class is preferably located in the archive.

The method preferably comprises the step of establishing a thread guard to limit access to the archive to a trusted thread calling the secure class loader.

The secure class loader may be used to load at least one further encrypted Java class file from another archive into the Java virtual machine, the secure class loader operating to keep track of which encrypted Java class file has been loaded from which archive.

The method may comprise the step of decrypting the at least one encrypted Java class file from the archive to an in-memory buffer from which it is loaded into the Java virtual machine by the secure class loader.

The archive may include a manifest file which includes at least one of the following items: the identity of the at least one encrypted Java class file; the name of the at least one encrypted Java class file; metadata relating to rights management of the at least one encrypted Java class file; and, at least one digital signature for the at least one encrypted Java class file; and the method may comprise the step of loading the manifest file into the Java virtual machine. The manifest file is preferably protected against tampering by a digital signature.

The archive may contain at least one encrypted Java class file that is digitally signed, the method comprising the step of the secure class loader pre-emptively decrypting the entire archive when it is first opened by the Java virtual machine but before any signed class files have been read from by the Java virtual machine.

The archive may be digitally signed after encryption.

The archive may be digitally signed both before and after encryption, with the pre-encryption signatures being stored in the encrypted Java archive so that they can be restored after the archive is decrypted.

According to another aspect of the present invention, there is provided a computer program containing program instructions for causing a computer to perform a method as described above. The computer program may be embodied in a digital rights management client.

According to another aspect of the present invention, there is provided a method of protecting Java bytecode, the method comprising the steps of: encrypting at least one Java class file to produce at least one encrypted Java class file; and, archiving, in an archive, the at least one encrypted Java class file; whereby a secure class loader can load the at least one encrypted Java class file from the archive into a Java virtual machine.

The method may comprise the step of configuring a Java application that depends on the encrypted Java archive to run by first loading an application stub class and calling an entry point within the application stub class. As noted above, the application stub can be used to execute DRM., native methods and decrypt and load the protected classes without requiring any modifications to the protected Java classes and particularly without requiring any modifications to the source code of the Java application.

The application stub class may be contained in the archive.

The method preferably comprises the step of including a proxy class in the archive that a secure class loader can attempt to load in order to stimulate file input/output requests when the Java application is run.

The method may comprise the step of: adding a manifest file to the archive, the manifest file including at least one of the following items: the identity of the at least one encrypted Java class file; the name of the at least one encrypted Java class file; metadata relating to rights management of the at least one encrypted Java class file; and, at least one digital signature for the at least one encrypted Java class file. The manifest file is preferably protected against tampering by a digital signature.

The archive may contain at least one encrypted Java class file that is digitally signed.

The archive may be digitally signed after encryption.

The archive may be digitally signed both before and after encryption, with the pre-encryption signatures being stored in the encrypted Java archive so that they can be restored after the archive is decrypted.

The at least one Java class file may provide at least one of the following functions: decrypting rights management protected content handled by a Java application; obtaining a licence; checking for licence validity; determining whether a function is permitted by licensed rights; obtaining information about a function; and, obtaining information about at least one licensing term.

According to another aspect of the present invention, there is provided a computer program containing program instructions for causing a computer to perform a method as described above.

According to another aspect of the present invention, there is provided a programming language having functionality to enable the method as described above. The language may be for example an interpreted language (e.g. Java or C#) or a compiled language (e.g. C++).

The preferred embodiment of the present invention thus provides techniques for wrapping Java bytecode within encryption and digital signatures, thus protecting it from decompilation and tampering, whilst still allowing the encrypted Java bytecode to be executed within standard off-the-shelf JVMs, preferably without requiring any changes to the underlying Java source or bytecode, and to use DRM techniques to effectively build commercial licensing and reporting functionality directly into the Java programming language.

In the preferred embodiment, native methods are used to build a secure class loader that is capable of loading encrypted class files from the local file system (or the network) into a standard, unmodified Java virtual machine without requiring source code modifications to the encrypted Java classes. These native methods are preferably used in conjunction with an installable file hook or patches applied to the operating system in order to allow for such a secure class loader.

The preferred embodiment of the present invention uses native methods to provide an opaque, tamperproof operation for progressively loading classes from a decrypted in-memory Java archive by using JVM-supplied functions designed to operate on the local file system but intercepted and modified by a DRM file hook or patches.

Embodiments of the present invention will now be described by way of example with reference to the accompanying drawings, in which.

In one preferred embodiment of the present invention, native methods and an installable file hook are used to build a secure class loader that is capable of loading archives containing encrypted class files from the local file system (or the network) into a standard, unmodified JVM (e.g. the JVM bundled within a web browser such as Microsoft Internet Explorer or Netscape Navigator) without requiring source code modifications to the encrypted Java classes. The approach is based upon an assumption that is satisfied by the majority of standard JVMs, namely that the Java native method API provide a means for native methods to load a named class from a given class loader.

An exemplary process by which Java classes are first encrypted within a Java archive by a DRM utility and then decrypted and loaded into a standard, unmodified JVM by a DRM client component implemented within Java native methods will be described with reference to FIG. 4.

Figure 1:
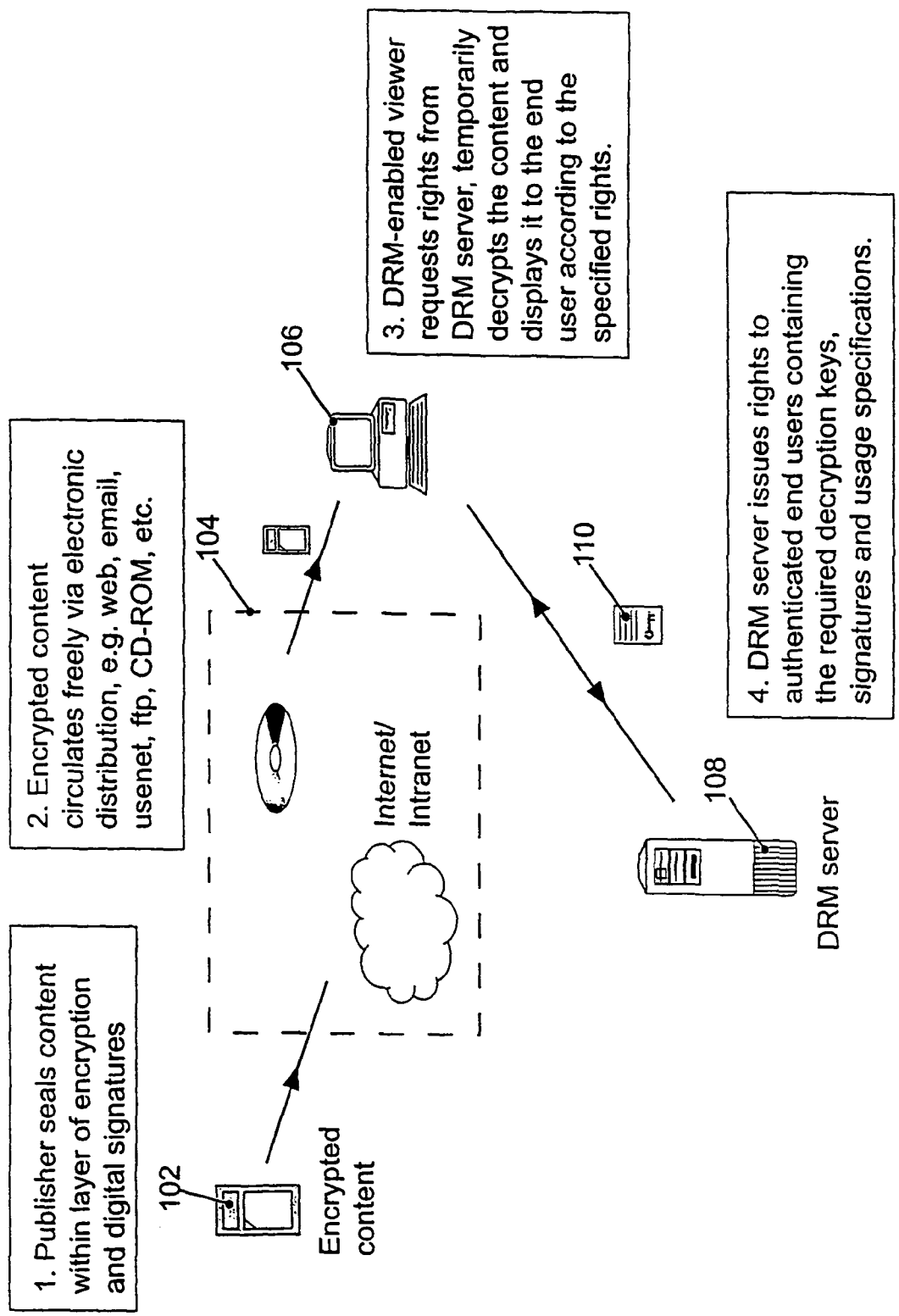
FIG. 1 illustrates schematically a DRM overview.
Figure 2:
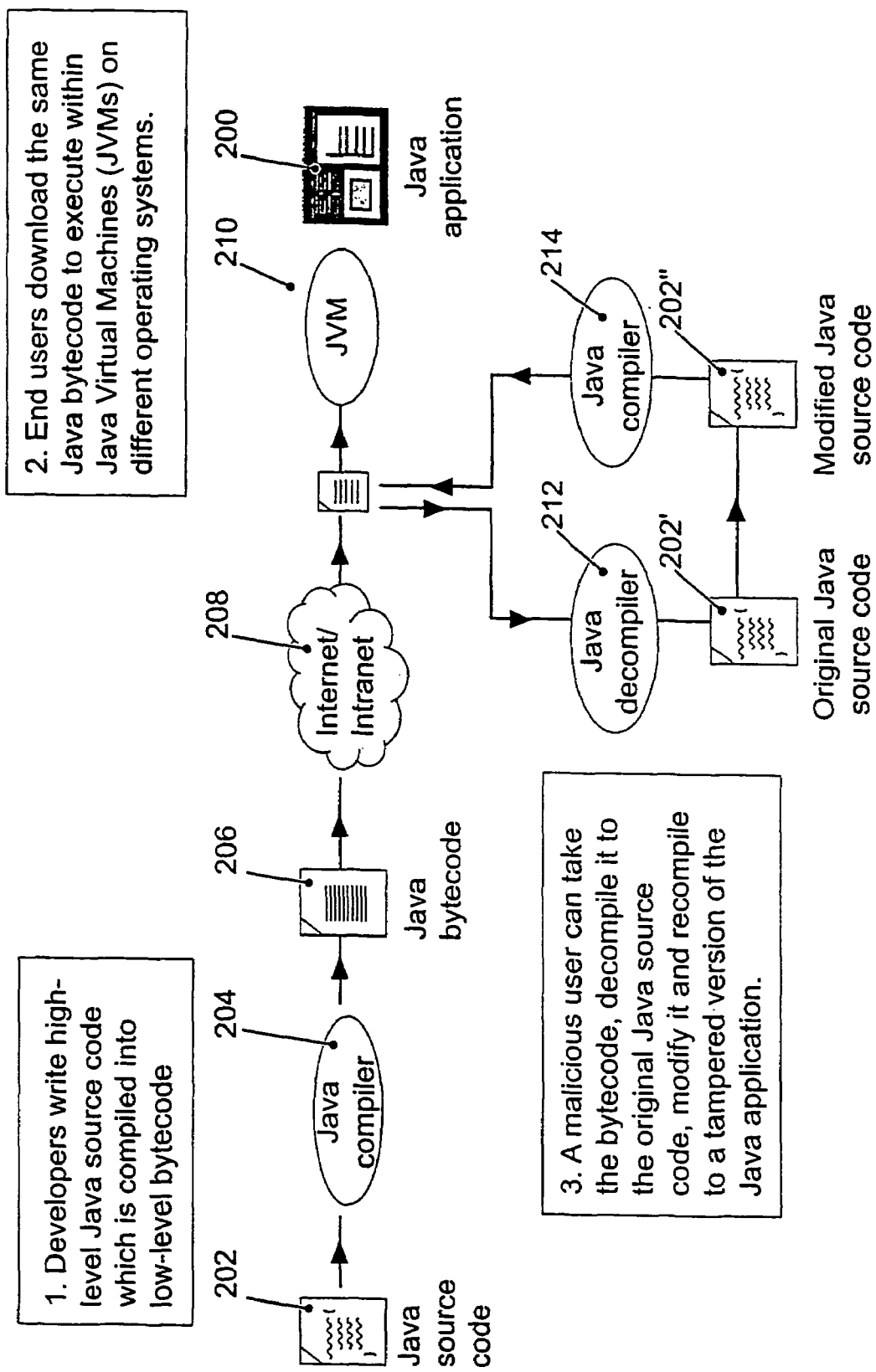
FIG. 2 illustrates schematically an example of decompiling and tampering of compiled Java bytecodes.
Figure 3:
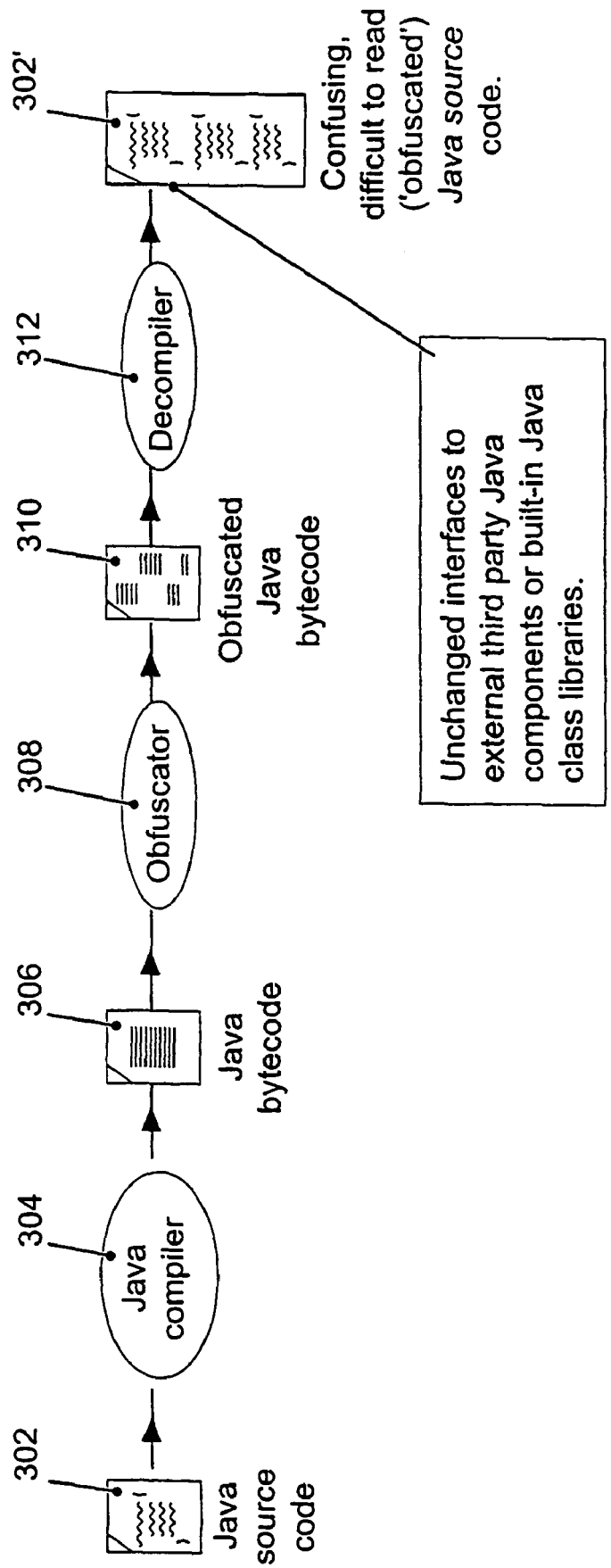
FIG. 3 illustrates schematically a conventional obfuscation technique.
Figure 4:
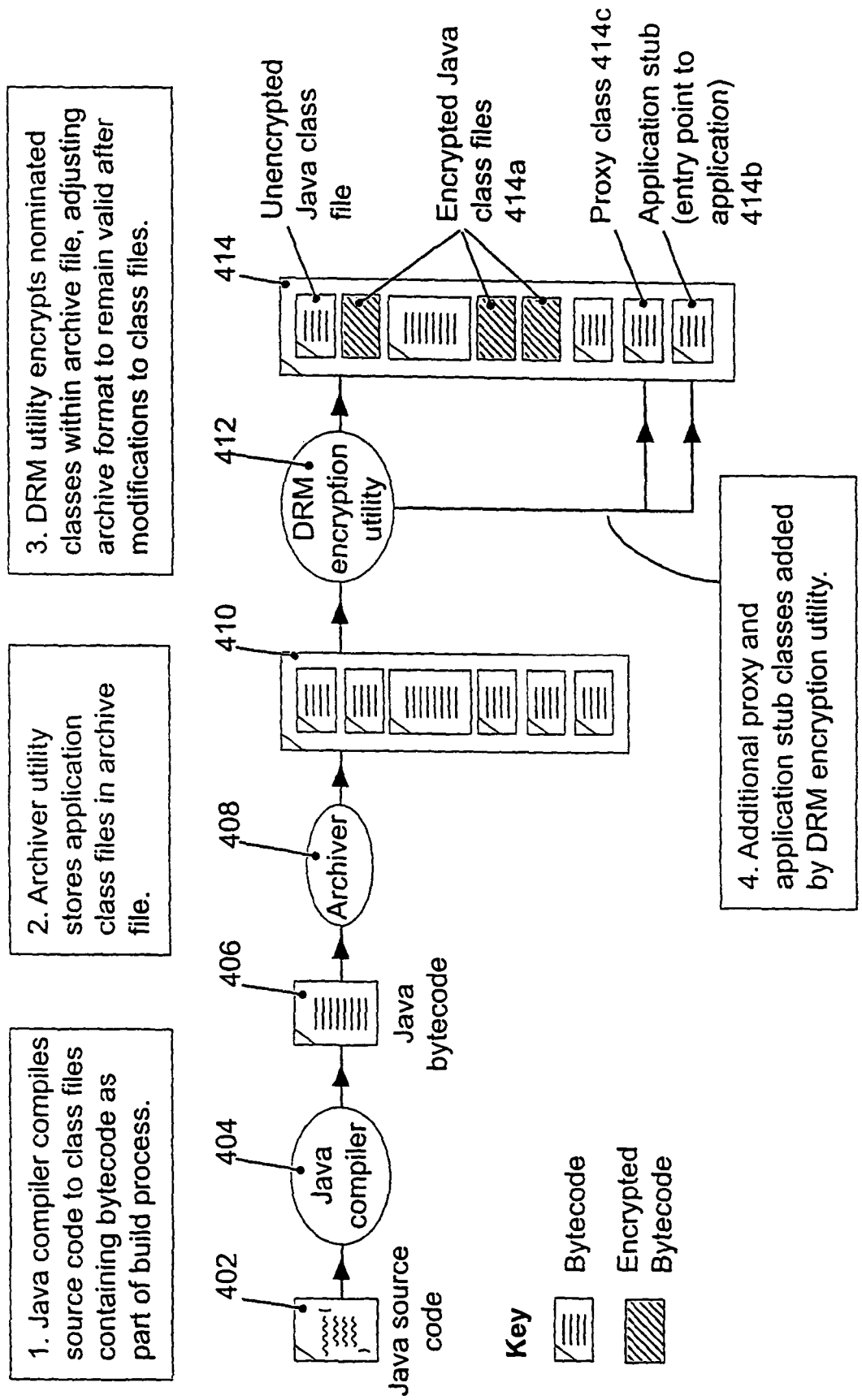
FIG. 4 illustrates schematically an example of a method of encrypting Java archives according to an embodiment of the present invention.

Referring to FIG. 4, during the build cycle, Java developers, as shown in step 404, compile Java source files 402 into class files containing bytecode 406. At the end of the build cycle, these class files are inserted, as shown by step 408, into a Java archive, e.g. a ZIP, JAR or CAB file 410.

A DRM encryption utility program that understands the Java archive format 410 is given the names of the classes 414a that are to be encrypted. As shown by step 412, it parses the Java archive 410 to locate the specified classes 414a, encrypts them within the Java archive and, if necessary, updates any internal archive data structures to ensure that the archive remains valid. If these updates result in the loss of data which cannot be recalculated at the time of decryption (e.g. field lengths or checksums from the decrypted content), then this data must be saved along with the encrypted bytecode. The. encrypted archive remains a valid archive after this processing, it is simply that some of its data is now encrypted, i.e. the archive is only partially encrypted: the data within it is encrypted but the archive itself is not. This partially encrypted Java archive is also referred to herein as the encrypted Java archive or the DRM-protected Java archive.

As part of step 412, an application stub class 414b is added to the archive (either by the DRM utility, manually or as part of the build process). This application stub class 414b is a simple Java class that ultimately calls the initial entry point of the DRM-protected Java application. Its full operation is further described below with reference to the decryption phase. The application stub class 414b is not encrypted within the DRM-protected archive.

A small proxy class 414c is also added in step 412 to the archive (either by the DRM utility, manually or as part of the build process). This proxy class 414c is a simple non-functional class that is loaded later by the client-side DRM system to stimulate file i/o on the encrypted Java archive, again as will be described further below.

The publisher of the encrypted Java archive configures the Java application such that it will be run by first loading the application stub class 414b and calling a predefined entry point within it.

Figure 5:
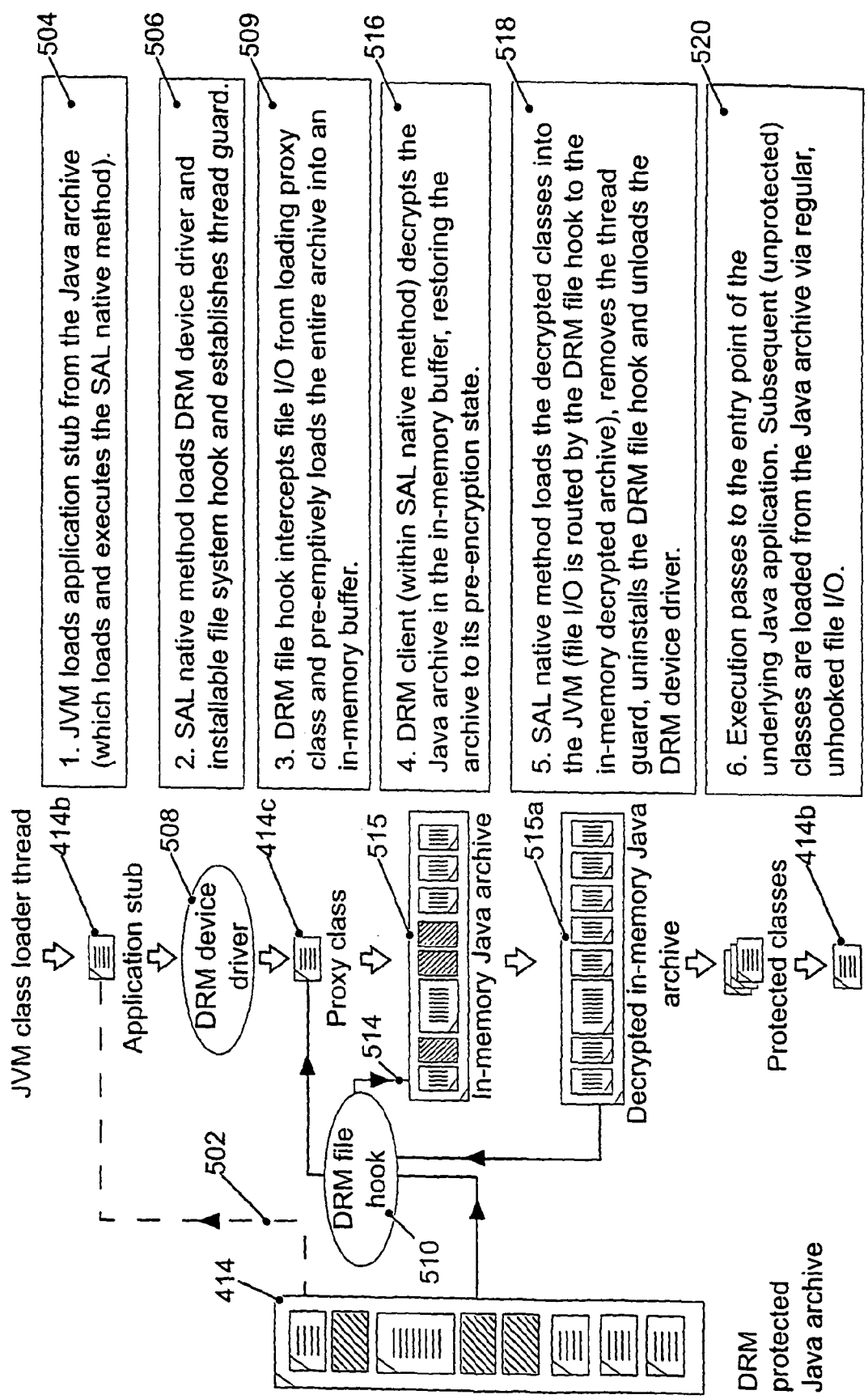
FIG. 5 illustrates schematically an example of a method of decrypting a previously encrypted Java archive using a secure class loader with an installable file hook according to an embodiment of the present invention.

FIG. 5 illustrates schematically an example of a method of decrypting a previously encrypted Java archive using a secure class loader with an installable file hook. As illustrated, the end user attempts to run the Java application that depends upon the DRM-protected Java archive 414. Since the publisher of the DRM-protected Java archive has configured the application to be run via the application stub class 414b, this causes the application stub class 414b, as shown in step 502, to be loaded from the DRM-protected archive and its entry point invoked. The application stub class 414b first loads the native method library containing the client-side DRM code implementing the secure class loader, as shown in step 504.

If successful, the application stub class 414b then calls a special native method to locate, decrypt and load the encrypted classes from the DRM-protected Java archive 414. This can all be done from within a single opaque native method (although using a single method, as opposed to multiple methods, is not necessary) without ever exposing decrypted bytecode to the vulnerable Java code. This special native method is also referred to herein as the secure application loader native method or SAL native method.

The SAL native method looks up the class loader of the application stub class 414b, i.e. the class loader responsible for loading classes from the encrypted Java archive. This can be achieved either by calling API functions available to native methods or by up-calling back into Java (where there are suitable member functions defined on the base Java classes java.lang.Object and java.lang.Class). This class loader is used to load subsequent classes from the DRM-protected archive.

The SAL native method, at step 506, then loads a device driver 508 (also referred to as the DRM device driver) capable of installing a file hook 510 (also referred to as the DRM file hook) which is itself capable of intercepting and modifying file i/o requests in the lowest levels of the operating system. On most operating system this requires the creation and installation of a special device driver as part of the client-side DRM installation. On some operating systems, the device driver and/or file hook must be installed at the time of OS start-up, in which case the device driver and/or file hook are installed in a deactivated mode and do nothing until activated via communications from the SAL native method. Creating and installing device drivers and file hooks involve known techniques long available to practitioners of low-level device driver development.

The SAL native method then communicates with the DRM device driver to establish a thread guard, i.e. to inform the DRM device driver 508 and/or file hook 510 that the SAL native method, running in its current thread, is about to initiate activity that will result in relevant file i/o (i.e. the loading of classes from the encrypted Java archive). The purpose of establishing the thread guard is two-fold: first, it tells the device driver 508 and/or file hook 510 to look out for file i/o from the DRM-protected Java archive and, secondly, to make sure that while the thread guard is in place no other operating system thread can take advantage of the DRM file hook 510 to obtain access to decrypted content from the DRM-protected Java archive.

Using the class loader recovered previously, the SAL method, at step 509, attempts to load the proxy class 414c from the DRM-protected Java archive. As mentioned above, the proxy class 414c is an unencrypted place holder class that does nothing apart from residing within the DRM-protected Java archive.

The activated file hook 510 intercepts all low-level file i/o operations (e.g. reads, writes, seeks, etc.) throughout the OS. If the thread is not the thread on which the SAL native method has set the thread guard, i.e. the thread currently attempting to load the proxy class 414c from the DRM-protected Java archive, then the file hook 510 passes the file i/o operations onto the next hook in the hook chain (if present) or through to the underlying unmodified OS file i/o services. If the thread is the trusted thread (i.e. the thread on which the guard has been set), the file hook 510 looks to see if it has already processed file i/o operations on this file (the file hook 510 keeps track of files being processed by the trusted thread via some file identifier passed as part of the file i/o operation, e.g. the low-level file number). If the file i/o operation is for a new file (in the context of the thread guard), then the file hook 510 uses the unhooked low-level OS file i/o services to inspect the new file. If the new file is in a supported Java archive format and contains DRM-encrypted class files, then the file hook 510 continues to use the low-level OS file i/o services to read the entire DRM-protected Java archive into an internal memory buffer 515 (step 514). Subsequent file i/o operations on the DRM-protected Java archive are now routed by the file hook 510 to the internal memory buffer 515 (as opposed to the file system) while file i/o operations on any other files are passed through to the underlying unmodified OS file i/o services. This phase thus uses the loading of an unencrypted innocuous proxy class 414c to stimulate file i/o activity on the DRM-protected Java archive so that it can be identified and read into an internal memory buffer 515. The proxy class 414c is read from the internal memory buffer 515 and loaded into the JVM.

If the proxy class 414c has been successfully loaded in step 509, the SAL native method communicates with the DRM device driver at step 516 to obtain access to the internal memory buffer 515 containing the DRM-protected Java archive. Depending upon the OS, this may involve passing pointers to buffers or actually copying buffers.

The SAL native method can now restore the DRM-protected Java archive to its original form by decrypting the encrypted class files within the DRM-protected Java archive in the internal memory buffer 515 and restoring any related archive data structures (e.g. field lengths or checksums). This is more easily achieved in the SAL native method than in the DRM device driver 508 since device drivers typically operate in resource-constrained environments (although performing the decryption on-demand from within the DRM device driver 508 is an option). The decryption may involve first authenticating the end user or their computer and obtaining cryptographic keys from local or network caches or servers. For present purposes it is in any event assumed that the DRM system has a secure means of obtaining these keys and protecting them from discovery and unauthorised redistribution.

The SAL method restores the decrypted Java archive 515a to be accessible from the DRM device driver 508 and file hook 510. By this point, the DRM client has recovered the original DRM-protected Java archive to an internal memory buffer 515a to which "trusted" file i/o operations are being redirected (for this trusted thread).

The SAL method, at step 518, now iterates through all the encrypted classes within the DRM-protected Java archive, requesting the JVM to load each class by name. This results in further file i/o requests being routed to the decrypted DMR-protected Java archive stored in the internal memory buffer 515a.

When the SAL method has successfully loaded all the DRM-protected classes it can communicate with the DRM device driver to remove the thread guard, de-allocate any buffers, remove or deactivate the DRM file hook 510 and to unload or deactivate the DRM device driver 508. By this point, the DRM-protected classes have been loaded into the JVM and stored in JVM-specific data structures in virtual memory from where they are far more difficult to reverse engineer than when stored on disk in the well documented Java class file format. Care should preferably be taken to ensure that the internal OS file i/o structures are left in a state such that subsequent unhooked file i/o for unencrypted classes within the (encrypted) DRM-protected Java archive on the local file system will succeed.

The SAL method can thereafter, at step 520, return control to the Java application stub class 414*b* which then hands over execution to the original entry point of the Java application. The basic use of application stubs to provide an executable wrapper around a Java application (including Java applets) is a standard technique available in Java programming. The application stub is used in this embodiment to load the DRM native method library and then to invoke the SAL native method without requiring any changes to the underlying DRM-protected Java application.

While according to one embodiment, the Java archive is loaded from the local file system, in an alternative embodiment the Java archive is loaded from a network. Almost all JVMs capable of loading archives over a network (e.g. web browsers such as Microsoft Internet Explorer and Netscape Navigator) actually download the archive to a cached file before processing it. Consequently, one of ordinary skill in the art will appreciate that the approach described above is also applicable to Java archives loaded from a network.

Some JVMs support the loading of applications from multiple archives. This can be accommodated by an embodiment which can be applied to an application loaded from multiple archives, some of which may be encrypted and some not. The approach described above is merely extended to keep track of which encrypted classes are within which archive. Proxies are provided within each encrypted archive which, when loaded, provide access to the class loader for each encrypted archive and stimulate file i/o to that archive (see above). The application stub is provided with a list of proxies. The proxy class could alternatively be a nominated class from within the application that does not need to be protected by encryption.

Figure 6:
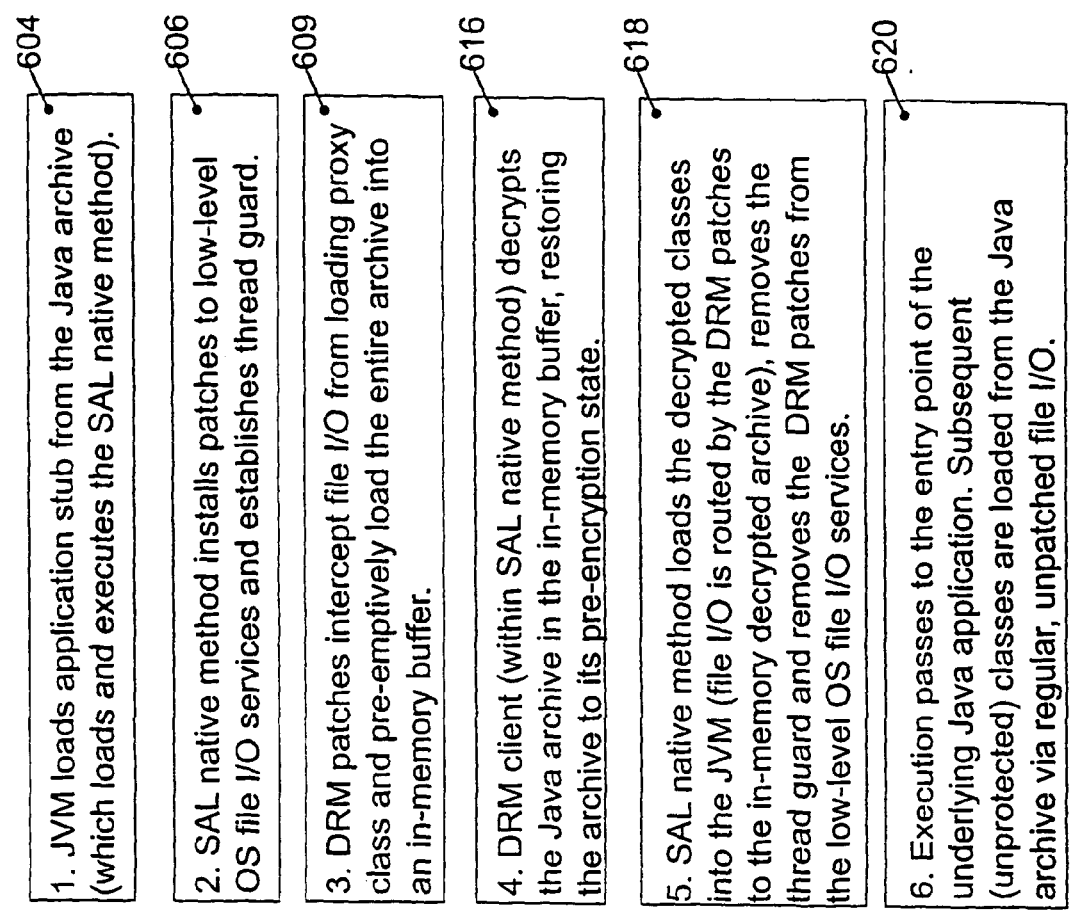
FIG. 6 illustrates schematically an example of a method of decrypting a previously encrypted Java archive using a secure class loader with operating system patches according to an embodiment of the present invention.
Figure 6:
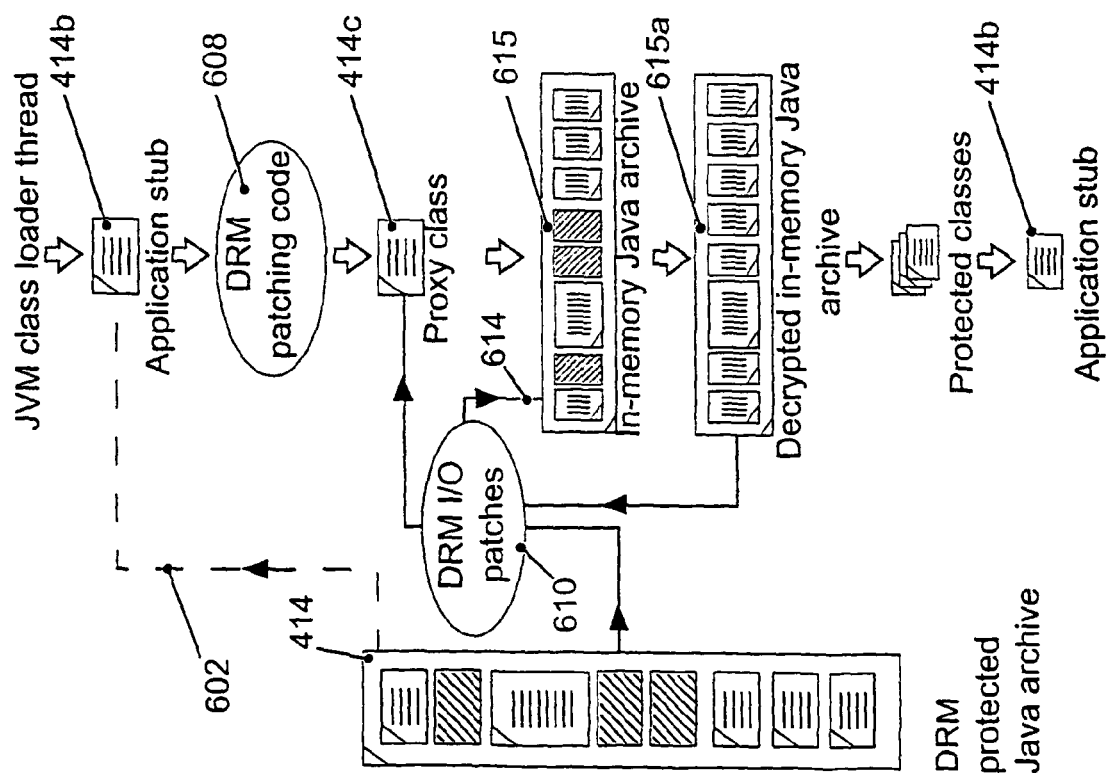

FIG. 6 illustrates schematically an example of a method of decrypting a previously encrypted Java archive using a secure class loader with operating system patches. This example is similar to that described above with reference to FIG. 5, but the use of an installable file hook is replaced by the use of patches applied to the operating system (OS) file i/o services. These patches are applied to the OS since the DRM client is able to patch the low-level OS file i/o services such that it can again intercept and modify file i/o requests from the target JVM. The encryption phase for this example is the same as described above with reference to FIG. 4.

With respect to the client-side decryption, and referring to FIG. 6, the end user attempts to run the Java application that depends upon the DRM-protected Java archive 414. Since the publisher of the DRM-protected Java archive has configured the application to be run via the application stub class 414*b*, this causes the application stub class 414*b*, as shown in step 602, to be loaded from the DRM-protected archive and its entry point invoked. The application stub class 414*b* first loads the native method library containing the client-side DRM code implementing the secure class loader, as shown in step 604. If successful, the application stub class 414*b* then calls a special native method to locate, decrypt and load the encrypted classes from the DRM-protected Java archive 414. This can all be done from within a single opaque native method (although using a single method, as opposed to multiple methods, is not necessary) without ever exposing decrypted bytecode to the vulnerable Java code. This special native method is again also referred to as the secure application loader native method or SAL native method.

The SAL native method looks up the class loader of the application stub class 414*b*, i.e. the class loader responsible for loading classes from the encrypted Java archive. This can be achieved either by calling API functions available to native methods or by up-calling back into Java (where there are suitable member functions defined on the base Java classes java.lang. Object and java.lang.Class). This class loader is used to load subsequent classes from the DRM-protected archive.

The SAL native method, at step 606, then installs a set of low-level patches 610 to the OS file i/o services which are capable of intercepting and modifying file i/o requests in the lowest levels of the operating system. On some operating systems, the file i/o service patches must be applied at the time of OS start-up, in which case the patches are installed in a deactivated mode and do nothing until activated from the SAL native method. Creating and installing OS patches involve techniques known in the art.

The SAL native method then establishes a thread guard, i.e. to inform the DRM file i/o patches 610 that the SAL native method, running in its current thread, is about to initiate activity that will result in relevant file i/o (i.e. the loading of classes from the encrypted Java archive). The purpose of establishing the thread guard is two-fold: first, it tells the DRM file i/o patches 610 to look out for file i/o from the DRM-protected Java archive and, secondly, to make sure that while the thread guard is in place no other operating system thread can take advantage of the DRM file i/o patches 610 to obtain access to decrypted content from the DRM-protected Java archive.

Using the class loader recovered previously, the SAL method loads, in step 609, the proxy class 414*c* from the DRM-protected Java archive. Again as mentioned above, the proxy class 414*c* is an unencrypted place holder class that does nothing apart from residing within the DRM-protected Java archive.

The activated DRM file i/o patches 610 intercept all low-level file i/o operations (e.g. reads, writes, seeks, etc.) from the JVM process. If the thread is not the thread on which the SAL native method has set the thread guard, i.e. the thread currently attempting to load the proxy class 414*c* from the DRM-protected Java archive, then the DRM file i/o patches 610 pass the file i/o operations through to the underlying unmodified OS file i/o services. If the thread is the trusted thread (i.e. the thread on which the guard has been set), the DRM file i/o patches 610 look to see if they have already processed file i/o operations on this file (the DRM file i/o patches 610 keep track of files being processed by the trusted thread via some file identifier passed as part of the file i/o operation, e.g. the low-level file number). If the file i/o operation is for a new file (in the context of the thread guard), then the DRM file i/o patches 610 use the unmodified low-level OS file i/o services to inspect the new file. If the new file is in a supported Java archive format and contains DRM-encrypted class files, then the DRM file i/o patches 610 continue to use the unmodified low-level OS file i/o services to read the entire DRM-protected Java archive into an internal memory buffer 615(step 614). Subsequent file i/o operations on the DRM-protected Java archive are now routed by the DRM file i/o patches 610 to the internal memory buffer 615 (as opposed to the file system) while file i/o operations on any other files are passed through to the underlying unmodified OS file i/o services. This phase again therefore uses the loading of an unencrypted innocuous proxy class 414*c* to stimulate file i/o activity on the DRM-protected Java archive so that it can be identified and read into an internal memory buffer 615. The proxy class 414c is read from the internal memory buffer 615 and loaded into the JVM.

If the proxy class 414c has been successfully loaded in step 609, the SAL native method obtains access to the internal memory buffer 615 containing the DRM-protected Java archive at step 616. Depending upon the OS, this may involve passing pointers to buffers or actually copying buffers.

The SAL native method can now restore the DRM-protected Java archive to its original form by decrypting the encrypted class files within the DRM-protected Java archive in the internal memory buffer 615 and restoring any related archive data structures (e.g. field lengths or checksums). This is more easily achieved in the SAL native method than in the DRM file i/o patches 610 since DRM file i/o patches typically operate in resource-constrained environments (although performing the decryption on-demand from within the DRM file i/o patches is an option). The decryption may involve first authenticating the end user or their computer and obtaining cryptographic keys from local or network caches or servers. For present purposes it is in any event assumed that the DRM system has a secure means of obtaining these keys and protecting them from discovery and unauthorised redistribution.

The SAL method restores the decrypted Java archive 615a to be accessible from the DRM file i/o patches 610. By this point, the DRM client has recovered the original DRM-protected Java archive to an internal memory buffer 615a to which "trusted" file i/o operations are being redirected (for this trusted thread).

The SAL method, as shown by step 618, now iterates through all the encrypted classes within the DRM-protected Java archive, requesting the JVM to load each class by name. This results in further file i/o requests being routed to the decrypted DRM-protected Java archive stored in the internal memory buffer 615a.

When the SAL method has successfully loaded all the DRM-protected classes it can remove or deactivate the DRM file i/o patches 610 and deallocate any buffers. By this point, the DRM-protected classes have been loaded into the JVM and stored in JVM-specific data structures in virtual memory from where they are far more difficult to reverse engineer than when stored on disk in the well documented Java class file format. Care should preferably be taken to ensure that internal OS file i/o structures are left in a state such that subsequent unmodified file i/o for unencrypted classes within the (encrypted) DRM-protected Java archive on the local file system will succeed.

The SAL method can thereafter, as shown by step 620, return control to the Java application stub class 414b which then hands over execution to the original entry point of the Java application. The basic use of application stubs to provide an executable wrapper around a Java application (previously defined to include Java applets) is a standard technique available in Java programming. The application stub is used in this embodiment to load the DRM native method library and then to invoke the SAL native method without requiring any changes to the underlying DRM-protected Java application.

Figure 7:
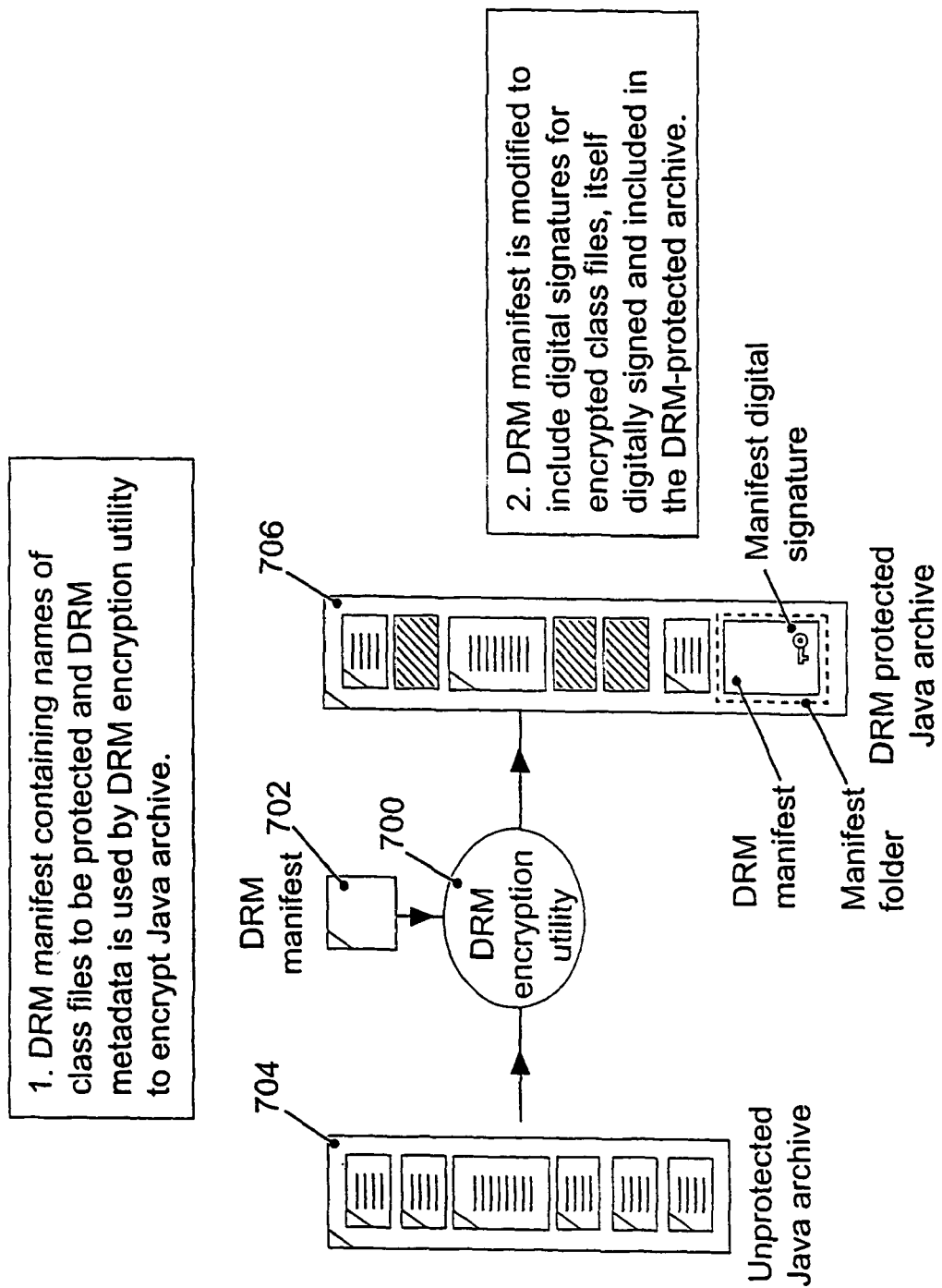
FIG. 7 illustrates schematically an example of a method of creating a DRM protected Java archive including a DRM manifest according to an embodiment of the present invention.

FIG. 7 illustrates schematically an example of a method of creating a DRM protected Java archive including a DRM manifest. A DRM encryption utility 700 adds an additional manifest file 702 (or set of manifest files) to the DRM-protected archive 704 containing information about the encrypted class files within the archive to obtain a DRM protected Java archive 706. This manifest can contain for example any of the following: (i) the names and/or locations of the encrypted class files within the DRM-protected archive; (ii) DRM metadata related to the licensing of the encrypted classes, e.g. their identity from a rights management perspective, the URLs of remote DRM rights servers, etc.; and (iii) digital signatures for the encrypted class files to enable the DRM client to verify that they have not been tampered with.

To prevent tampering, the manifest is itself preferably digitally signed with a private key known only to the DRM client. The DRM client verifies the manifest signature to check that the manifest has not been tampered with. Once it has verified the manifest signature, the DRM client uses the DRM data in the manifest file to perform its rights management operations, e.g. obtain licences and decryption keys, iterate through the archive decrypting encrypted class files (see above), etc. All Java archive formats support the concept of folders, in an analogous fashion to directories in a typical OS file system. The manifest can be given a DRM-recognisable name and stored in a special DRM folder within the archive so that it does not clash with the names of the class files.

It is to be noted that the separate manifest within the DRM-protected archive may in practice be one manifest file or several.

Figure 8:
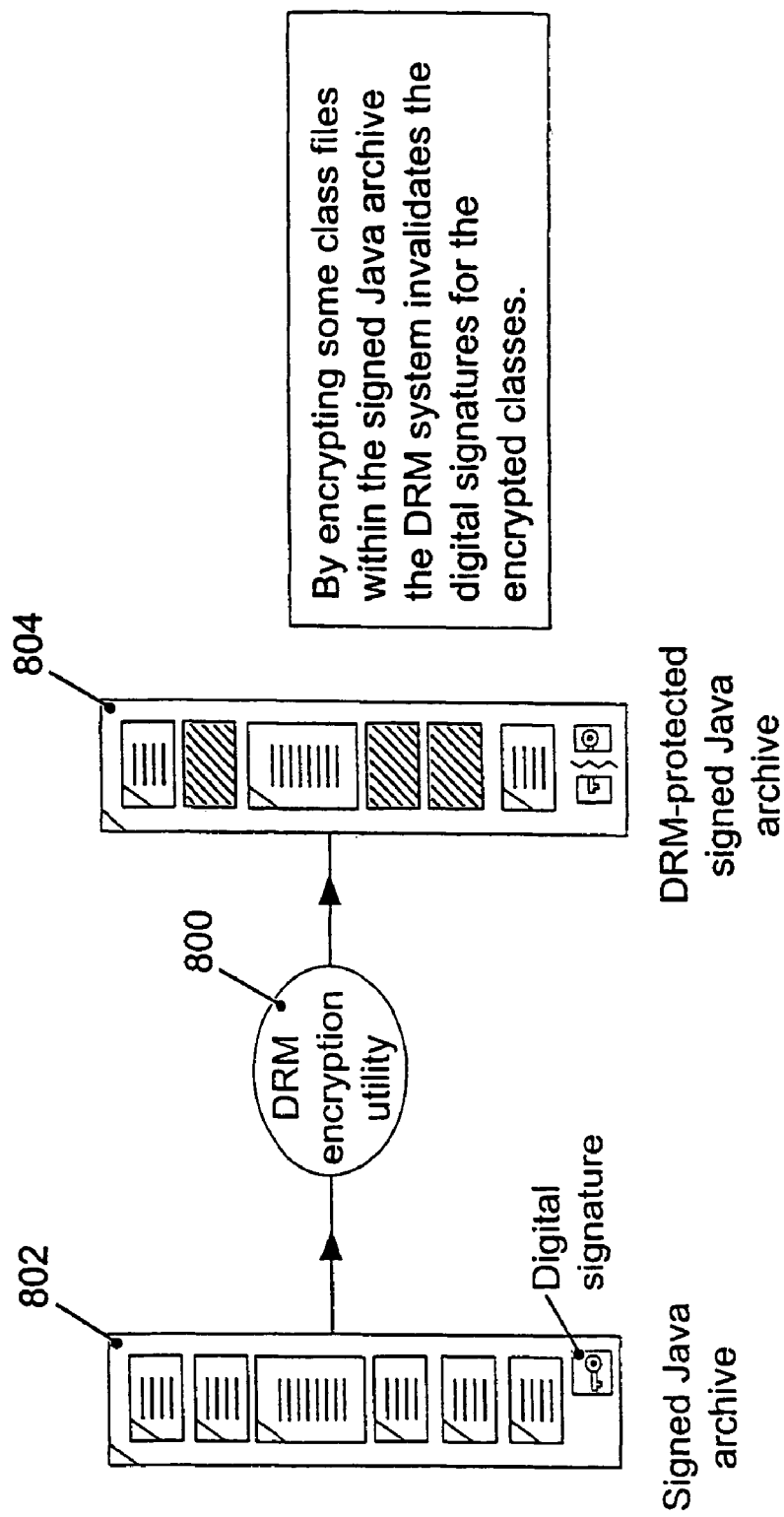
FIG. 8 illustrates schematically an example of a method of use of a DRM encryption utility to create a DRM protected signed Java archive according to an embodiment of the present invention; and, FIG. 9 illustrates schematically how Java tamperproofing enables full DRM capabilities to be built into the Java programming language.

FIG. 8 illustrates schematically an example of a DRM encryption utility 800 that creates a DRM protected signed Java archive 804 from a signed Java archive 802. Java applications are typically downloaded to the end user's computer and executed within a specific vendor's JVM. Since Java applications are active, executable components, there is a risk (to the end user) that the Java application is not what it appears to be and is in fact a "virus", i.e. a malicious application intent on causing damage to the end user's computer or obtaining access to sensitive end user information. Consequently, there are several levels of security built into the Java language aimed at protecting the end user. One of these levels of security is known as code-signing where the Java classes are packaged into a Java archive (e.g. in ZIP, JAR or CAB format) and the archive is digitally signed so that compatible JVMs can detect any signs of tampering with the Java archive.

Digital signing involves calculating cryptographic hash values for the class files within the archive and encrypting them using a secret key. Hash functions are mathematical algorithms used to calculate a value encoded as a small number of bytes from a buffer containing a potentially far larger number of bytes. The value is calculated such that it is (a) difficult or impossible to reconstitute the larger buffer from the hash value and (b) very difficult to construct another large buffer that would yield the same hash value.

Verifying digital signatures involves recalculating the cryptographic hash values for the class files within the archive, decrypting the original hash values using the secret key (or the matching key from a public-key, private-key pair), and comparing the hash values. If the class files have been modified, the hash values will be different. The hash values are protected by the encryption. This is a widely used, well-known technique. The problem for DRM systems wishing to encrypt signed Java archives (such as those described above) is that when the DRM system encrypts class files within the Java archive, it is effectively tampering with the class files and invalidating the archive's digital signatures. This may not be a problem if the DRM client is able to restore the encrypted Java archive to its original form before the digital signatures are verified, but this is often not possible. The methods discussed above can be extended to handle signed Java archives.

If the archive's digital signatures are checked one at a time, at the time each class is loaded from the Java archive, then no changes need be made to the processes described above, since before the first encrypted class is loaded it will already have been pre-emptively restored as a consequence of loading the unencrypted proxy class. The application stub and proxy will already have been loaded but their signatures will be valid since they were not encrypted.

If all the archive's digital signature are checked at the time that the first class is loaded from the archive, then the DRM client cannot afford to load even the application stub from the DRM-protected Java archive (otherwise the JVM will detect the invalid signatures caused by the encrypted class files and refuse to load the Java archive). Various ways of decrypting the DRM-protected archive before any classes are loaded from it are available.

For example, the DRM client can monitor all file i/o (using either of the methods described previously) for DRM-protected Java archives being opened, and pre-emptively decrypt them.

As another example, the application stub class can be locally installed as part of the DRM client installation and loaded from the local file system. This gives it the privilege to execute the SAL native method, load the proxy class and pre-emptively decrypt the DRM-protected Java archive and load the decrypted classes, as described previously.

An alternative method for avoiding the problem of invalid digital signatures is to sign the Java archive after it has been partially encrypted (so that the encrypted Java archive has valid digital signatures). It may also be necessary to sign the Java archive before and after the encryption phase so that the pre-encryption signatures for class files can be stored during the encryption phase and restored at the decryption phase.

Figure 9:
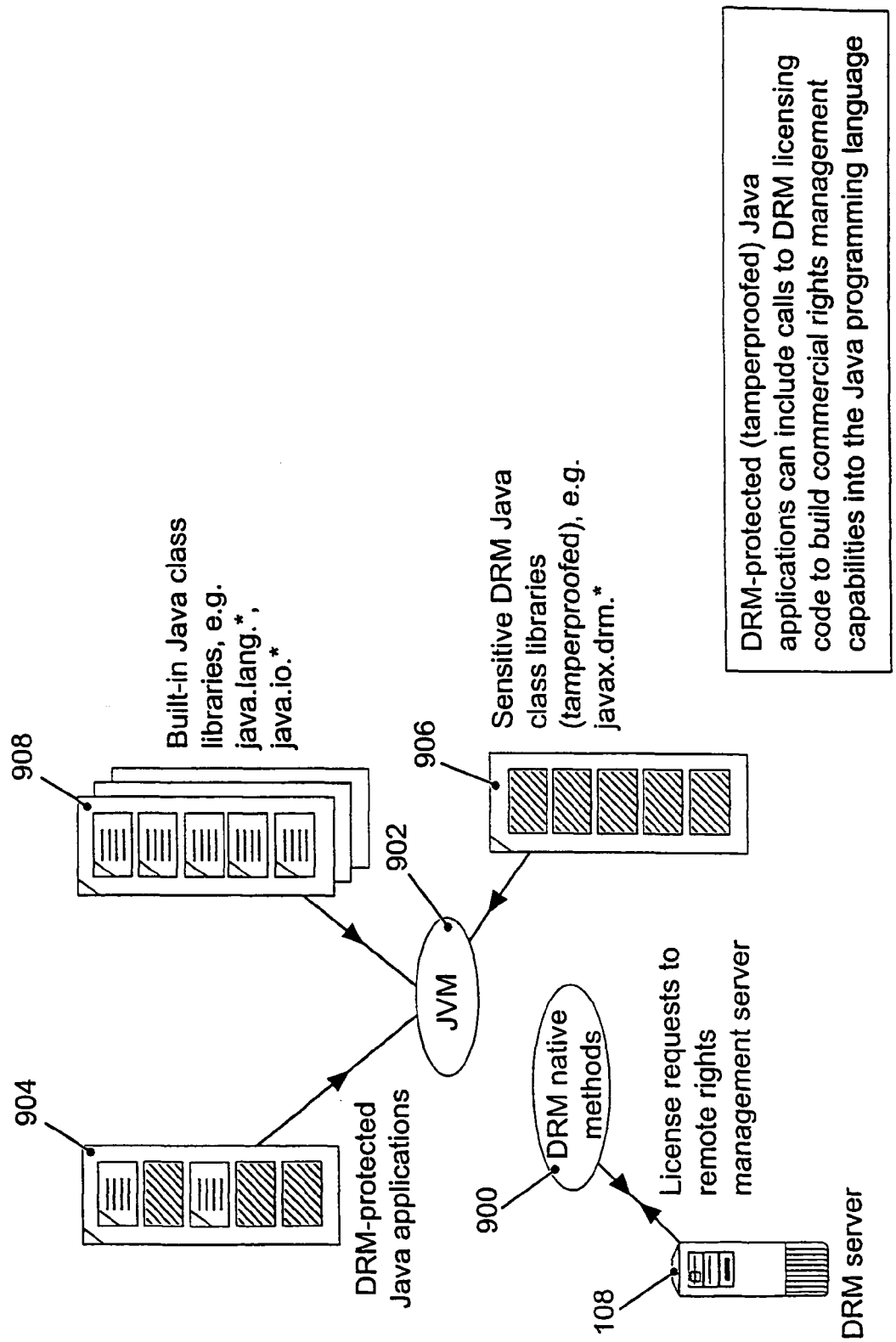

FIG. 9 illustrates schematically an example of how the Java tamperproofing techniques described above enable full DRM capabilities to be built into the Java programming language. Client-side DRM systems are effectively complex rights management engines that are capable of decrypting encrypted content, authenticating end users, and obtaining and managing the rights that end users have over specific pieces of digital content. The client-side DRM may also include secure viewers for supported format (e.g. a secure HTML renderer) or the DRM client may itself be included within a secure viewer. Whichever way, the DRM client must hand off decrypted content to a secure viewer from which it cannot easily be recovered (in its decrypted form) by unauthorised users. The interface between the secure viewer and the DRM client in software is in practice inevitably via a DRM client-side programming API.

Referring to FIG. 9, in the case of Java, secure viewer 902 is a Java Virtual Machine (JVM). The DRM client, as discussed above, is responsible for loading encrypted classes from within a partially encrypted Java archive 904. Additional rights management functionality is exposed as part of a Java DRM programming API which is exposed as a DRM class library 906 (for example javax.drm.*). Typical functionality provided by the Java DRM programming API includes: (i) decrypting DRM-protected content handled by the Java application; (ii) obtaining licences and checking for ongoing validity; (iii) checking whether certain licensed functionality is permitted by the end user rights, e.g. printing, saving, etc.; and (iv) obtaining information about licensed functionality and licensing terms Both the Java DRM implementation and the calling Java application code can be protected from tampering by the techniques described above. Using the Java tamperproofing techniques described above to protect Java rights management code, combined with the easy extensibility of JVMs beyond the built-in Java class libraries 908, through installable class libraries, enables DRM vendors to effectively build digital rights management directly into the Java programming language. Without this, any rights management or security technology built into Java applications can easily be reverse engineered (using a disassembler or decompiler) and removed or modified. The built-in security features of Java, such as code-signing, are all aimed at protecting the end user from malicious Java applications and do nothing to protect Java applications from malicious end users.

Accordingly, in this example, Java tamperproofing techniques are used in conjunction with a client-side DRM API implemented in Java so as to be able to offer powerful licensing and rights management capabilities to the developers of Java applications. As Java applications become more widely used in a commercial context (i.e. as opposed to purely in-house developments where security and licensing is less of an issue), this aspect will become very important. Example applications include (i) content delivery systems implemented in Java which need to be able to deliver valuable content (e.g. documents, audio, video, etc.) to consumers in a controlled fashion without losing control of that content; and (ii) e-commerce systems that handle sensitive information (such as credit card information) and need to be protected from unauthorised access.

Embodiments of the present invention have been described with particular reference to the examples illustrated. However, it will be appreciated that variations and modifications may be made to the examples described within the scope of the present invention.

The invention claimed is:

1. A computer implemented method of running a Java application that uses a previously encrypted Java archive in order to prevent or inhibit tampering of the Java application, the encrypted Java archive comprising at least one encrypted Java class file, the method comprising:
   loading an application stub class;
   loading and executing a native method using the application stub class, the execution of the native method comprising the steps of:
   establishing a protective process capable of intercepting and modifying file input/output requests;
   identifying and loading the at least one encrypted Java class file required by the Java application from the archive into memory, using a proxy class to simulate file input/output requests to the archive;
   decrypting the at least one encrypted Java class file in the memory;
   loading the at least one decrypted Java class file into a virtual machine;
   removing the protective process; and
   implementing the Java application using the at least one previously encrypted Java class file loaded into the Java virtual machine.

2. A method according to claim 1, wherein the protective process comprises a file hook which intercepts and modifies file input/output requests.

3. A method according to claim 2, further comprising loading a device driver to install the file hook.

4. A method according to claim 1, wherein the protective process comprises a patch which intercepts and modifies file input/output requests.

5. A method according to claim 1, wherein the protective process comprises a trap patch which intercepts and modifies file input/output requests.

6. A method according to claim 1, further comprising:
   calling an entry point within the application stub class thereby to call the secure class loader.

7. A method according to claim 6, wherein the application stub class is not contained in the archive so that the application stub class is able to invoke the secure class loader to preemptively decrypt the archive before the Java virtual machine has opened the archive.

8. A method according to claim 6, wherein the application stub class is saved locally at a client device where the Java application is run.

9. A method according to claim 6, wherein the application stub class is located within the archive.

10. A method according to claim 1, wherein the proxy class is located in the archive.

11. A method according to claim 1, wherein the protective process comprises a thread guard to limit access to the archive to a trusted thread calling the secure class loader.

12. A method according to claim 1, further comprising using the secure class loader to load at least one further encrypted Java class file from another archive into the Java virtual machine, the secure class loader operating to keep track of which encrypted Java class file has been loaded from which archive.

13. A method according to claim 1, further comprising loading a manifest file into the Java virtual machine, the manifest file including at least one of the following items:
   the identity of the at least one encrypted Java class file;
   the name of the at least one encrypted Java class file;
   metadata relating to rights management of the at least one encrypted Java class file; and
   at least one digital signature for the at least one encrypted Java class file.

14. A method according to claim 13, wherein the manifest file is protected against tampering by a digital signature.

15. A method according to claim 1, wherein the archive contains at least one encrypted Java class file that is digitally signed, the secure class loader preemptively decrypting the entire archive when the archive is first opened by the Java virtual machine but before any signed class files have been read from by the Java virtual machine.

16. A method according to claim 1, wherein the archive is digitally signed after encryption.

17. A method according to claim 1, wherein the archive is digitally signed both before and after encryption, with the pre-encryption signatures being stored in the encrypted Java archive so that the signatures are able to be restored after the archive is decrypted.

18. A method according to claim 1, further comprising providing a plurality of results of the input/output request to an end user of a distributed rights management system.

19. A computer program product comprising a computer readable medium having computer program code for running a Java application that uses a previously encrypted Java archive in order to prevent or inhibit tampering of the Java application, the encrypted Java archive comprising at least one encrypted Java class file, the computer program code for:
   loading an application stub class;
   loading and executing a native method using the application stub class, the execution of the native method comprising the steps of:
   establishing a protective process capable of intercepting and modifying file input/output requests;
   identifying and loading the at least one encrypted Java class file required by the Java application from the archive into memory, using a proxy class to simulate file input/output requests to the archive;
   decrypting the at least one encrypted Java class file in the memory;
   loading the at least one decrypted Java class file into a virtual machine;
   removing the protective process; and
   implementing the Java application using the at least one previously encrypted Java class file loaded into the Java virtual machine.

20. A computer program product according to claim 19, wherein the computer program code is embodied in a digital rights management client.

* * * * *

UNITED STATES PATENT AND TRADEMARK OFFICE
CERTIFICATE OF CORRECTION

PATENT NO. : 7,590,863 B2  Page 1 of 1
APPLICATION NO. : 10/398567
DATED : September 15, 2009
INVENTOR(S) : Martin R. Lambert It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1315 days.

Signed and Sealed this

Twenty-first Day of September, 2010

David J. Kappos
*Director of the United States Patent and Trademark Office*